(12) United States Patent
Islim et al.

(10) Patent No.: US 12,191,908 B2
(45) Date of Patent: *Jan. 7, 2025

(54) RECEIVER AND ASSOCIATED MOBILE COMMUNICATIONS DEVICE

(71) Applicant: PURELIFI LIMITED, Edinburgh (GB)

(72) Inventors: Mohamed Sufyan Islim, Edinburgh (GB); Harald Haas, Edinburgh (GB)

(73) Assignee: PURELIFI LIMITED, Edinburgh (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/356,548

(22) Filed: Jul. 21, 2023

(65) Prior Publication Data

US 2023/0361874 A1 Nov. 9, 2023

Related U.S. Application Data

(63) Continuation of application No. 16/472,829, filed as application No. PCT/GB2017/053797 on Dec. 19, 2017, now Pat. No. 11,742,948.

(30) Foreign Application Priority Data

Dec. 23, 2016 (GB) ...................................... 1622169

(51) Int. Cl.
 *H04B 10/116* (2013.01)
 *H04B 10/114* (2013.01)
 *H04M 1/72454* (2021.01)

(52) U.S. Cl.
 CPC ....... *H04B 10/116* (2013.01); *H04B 10/1143* (2013.01); *H04M 1/72454* (2021.01)

(58) Field of Classification Search
 CPC ..................................................... H04B 10/116
 See application file for complete search history.

(56) References Cited

U.S. PATENT DOCUMENTS 9,106,336 B1 8/2015 Brouillet
10,291,319 B1 * 5/2019 Karplus ................ G01S 7/4817
 (Continued)

FOREIGN PATENT DOCUMENTS

| CN | 105450302 | | 3/2016 |
| CN | 105450302 A | * | 3/2016 |
| GB | 2506383 | | 4/2014 |

OTHER PUBLICATIONS

International Search Report and Written Opinion dated Apr. 26, 2018 in Application No. PCT/GB2017/053797.
 (Continued)

*Primary Examiner* — Pranesh K Barua
(74) *Attorney, Agent, or Firm* — SNELL & WILMER L.L.P.

(57) ABSTRACT

An optical wireless communications receiver for a portable communications device, the receiver being configured to receive radiation signals on which communication data is encoded, wherein the receiver is comprised in or on or configured for mounting to at least part of a periphery or edge of the device. Advantageously, the optical wireless communications comprises a plurality of, receiver elements distributed along or around the receiver and/or comprises an optical guide configured to receive radiation and convey at least part of the radiation along the optical guide to at least one of the receiver elements.

24 Claims, 6 Drawing Sheets

(56) References Cited

U.S. PATENT DOCUMENTS

| | | | |
|---|---|---|---|
| 2002/0154383 A1 | 10/2002 | Oran | |
| 2005/0265731 A1 | 12/2005 | Keum | |
| 2006/0013595 A1 | 1/2006 | Trezza | |
| 2007/0008258 A1 | 1/2007 | Yamamoto | |
| 2008/0275572 A1 | 11/2008 | Tillotson | |
| 2009/0269073 A1 | 10/2009 | Kitaji | |
| 2010/0098430 A1 | 4/2010 | Chui et al. | |
| 2010/0098439 A1 | 4/2010 | Shin et al. | |
| 2012/0076509 A1* | 3/2012 | Gurovich | H04B 10/116 398/202 |
| 2012/0275796 A1* | 11/2012 | Yokoi | H04B 10/1141 398/118 |
| 2013/0279919 A1 | 10/2013 | Yokoi | |
| 2013/0308955 A1 | 11/2013 | Walewski | |
| 2014/0010549 A1 | 1/2014 | Kang | |
| 2014/0192208 A1 | 7/2014 | Okincha | |
| 2015/0244457 A1* | 8/2015 | O'Brien | H04B 10/1141 398/118 |
| 2016/0191158 A1* | 6/2016 | Aoyama | H04B 10/54 398/172 |
| 2016/0261342 A1 | 9/2016 | Yamasaki | |
| 2016/0294472 A1* | 10/2016 | Palmer | H04B 7/0617 |
| 2017/0193300 A1* | 7/2017 | Shatz | H04M 1/737 |
| 2018/0180470 A1* | 6/2018 | Seitz | G01J 1/46 |
| 2018/0227051 A1* | 8/2018 | Shim | H04N 23/60 |
| 2019/0044618 A1 | 2/2019 | Collins | |

OTHER PUBLICATIONS

Uspto, Non-Final Office Action dated Jan. 24, 2020 in U.S. Appl. No. 16/472,829.
Uspto, Final Office Action dated Aug. 20, 2020 in U.S. Appl. No. 16/472,829.
Uspto, Final Office Action dated Sep. 2, 2021 in U.S. Appl. No. 16/472,829.
Uspto, Non-Final Office Action dated May 26, 2022 in U.S. Appl. No. 16/472,829.
Uspto, Final Office Action dated Jan. 5, 2023 in U.S. Appl. No. 16/472,829.
Uspto, Notice of allowance dated Apr. 13, 2023 in U.S. Appl. No. 16/472,829.

* cited by examiner

RECEIVER AND ASSOCIATED MOBILE COMMUNICATIONS DEVICE

CROSS-REFERENCE TO RELATED APPLICATIONS

This application is a continuation of, claims priority to and the benefit of, U.S. Ser. No. 16/472,829 filed Jun. 21, 2021 and entitled "RECEIVER AND ASSOCIATED MOBILE COMMUNICATIONS DEVICE." The '892 application is a 371 of, claims priority to and the benefit of, PCT/GB2017/053797 filed Dec. 19, 2017 and entitled "RECEIVER AND ASSOCIATED MOBILE COMMUNICATIONS DEVICE." The '797 PCT application claims priority to and the benefit of UK Application No. 1622169.9, filed on Dec. 23, 2016 and entitled "RECEIVER AND ASSOCIATED MOBILE COMMUNICATIONS DEVICE." All of the foregoing applications are hereby incorporated in their entirety by reference for all purposes.

FIELD

The present disclosure relates to a receiver and mobile device for providing wireless communications, for example but not exclusively, optical wireless communications.

BACKGROUND

There is predicted to be a significant increase in the amount of data used in wireless communications, such as in cellular networks and Wi-Fi networks. So-called 4G technology has been widely deployed in cellular telecommunication networks, which has enabled a significant increase in data transmission rates sufficient to enable mobile devices to receive high definition videos, among other data-heavy applications.

It is expected that the volume of data being transmitted over existing RF networks, such as cellular networks and Wi-Fi networks, will continue to increase, which has led to the prediction of a "spectrum crunch", in which the radiofrequency (RF) spectrum available for traditional wireless communication methods is no longer sufficient to carry the required volume of data.

Visible light communication (VLC) and other optical communication techniques (for example non-visible light communication such as infrared communication) have emerged as a potential candidate to address the spectrum crunch. Compared with RF communication, VLC operates at an unregulated part of the electromagnetic spectrum and is intrinsically safe to be used in electromagnetic interference (EMI) sensitive environments, such as aircraft, hospitals and oil refineries. VLC and other optical techniques may provide a method to enable higher bandwidth data transmission than is currently possible using RF techniques. However, in order for VLC techniques to become more widely deployed, cellular devices need to be VLC enabled. For example, cellular devices such as smartphones and tablets which are currently on the market will likely require additional hardware and software in order to make use of the higher bandwidth afforded by VLC and other optical communication techniques.

In particular, some challenges in implementing visible light communications (VLC) or light fidelity (LiFi) in mobile hand-held devices include collecting sufficient optical power to achieve a reliable communication over a wide field of view, whilst minimising interruptions to signals and doing so in a convenient and practical form factor. It would also be beneficial to improve the signal-to-noise ratio.

SUMMARY

According to an example of the present disclosure there is provided an optical wireless communications receiver for a device, the receiver being configured to receive radiation signals on which communication data is encoded.

The receiver may be comprised in or on or configured for mounting to at least part or all of a periphery, perimeter or edge of the device.

At least part or all of the receiver may be shaped to follow or be conformed to at least part or all of the shape of the periphery, perimeter or edge of the device, e.g. on the sides of the device. The receiver may be configured to receive the radiation signals on at least two edges or sides and/or corners of the periphery of the device in use.

The receiver may comprise one or more, e.g. a plurality of, receiver elements. The receiver may comprise an array of receiver elements. The receiver elements may be distributed along or around the receiver, e.g. so that the receiver elements are distributed around the periphery or perimeter, e.g. the sides or edges, of the mobile device in use. At least one or each of the receiver elements may be spaced apart and/or separated from at least one or each other receiver element.

The one or more receiver elements may be or comprise optical receiver elements. The receiver elements may be or comprise photodiodes, such as avalanche photodiodes, or other suitable optical receivers, such as but not limited to positive-intrinsic-negative (PIN) devices, phototransistors, photoresistors, light activated silicon controlled rectifiers, or the like.

The receiver may comprise a guide such as a light guide or optical guide, which may be comprised in, or on or configured for mounting to, at least part of the periphery, perimeter or edge of the device. The guide may be configured to receive the radiation signals and convey at least part of the radiation signals along at least part or all of the guide.

The guide may be or comprise or be comprised in an optical concentrator. The guide, e.g. the optical concentrator, may comprise an optically active material, such as a luminescent, fluorescent or scintillating material, fluorophores, Perovskite, Quantum dots and/or the like. The optical receiver may comprise one or more optical fibres. The optical receiver may comprise one or more solid sections.

The optically active material may be configured to absorb or receive incident radiation signals and may be configured to re-emit radiation signals, e.g. at one or more different wavelengths to the absorbed or received radiation signal. At least some of the different wavelengths may be longer wavelengths that those of the absorbed or received radiation signals.

The optically active material may be configured to re-emit the radiation signals along and within the guide. The guide may be configured to convey at least some or all of the radiation signals, such as the received and/or re-emitted radiation signals, within and along the guide, e.g. by internal reflection. The guide may comprise a cladding, such as a transparent cladding, e.g. a glass or polymeric cladding or be formed of a matrix or substrate such as a polymeric material or glass or other crystalline material.

The receiver may comprise a reflective coating over at least part of its surface. The reflectivity of the reflective coating may be non-isotropic or be higher in a transmission direction than an opposite direction. For example, the reflective coating may be configured to accept or preferentially accept radiation signals from out with the receiver and reflect or preferentially reflect radiation signals within the receiver. The receiver may be, comprise or be provided with an anti-reflective coating along at least part of its outermost surface.

The one or more receiver elements may be configured to receive the radiation signals, e.g. directly and/or from the guide. The one or more receiver elements may be configured to receive at least some of the radiation that received and/or conveyed by the guide and/or at least some of the radiation signals that have been re-emitted by the optically active material.

The device may be or comprise a mobile and/or handheld device, such as a mobile communications device and/or a mobile user device, such as a mobile phone or smartphone, pda, tablet computer, phablet, laptop, e-book reader, personal computer, electronic game device, smartwatch, and/or the like. The wireless communications receiver may be, comprise or be comprised in a case or cover for the device, such as a bumper protector. The receiver and/or the case or cover may be fitable or retrofittable to the device.

The device may be, comprise or be comprised in an object such as a window, window frame, or other room, building or structural fitting (e.g. by mounting or otherwise being integrated or attached to the device, or the like). The object may comprise or be configured to communicate with the receiver. The object may comprise or be configured to communicate with a transmitter configured to relay signals received via the receiver to another device such as a mobile and/or handheld device and/or mobile user device and/or Internet of Things (IoT) device in the vicinity of the object. The object may comprise or be configured to communicate with a transceiver associated with the object. The transceiver may comprise the receiver. The receiver, transmitter and/or transceiver associated with the object may act as a relay or router for radiation signals on which communication data is encoded (for example, which may be provided by an access point, transmitter and/or transceiver (which may be comprised in a light fitting, or the like) in the vicinity of or operable to communicate with the object and configured to provide the radiation signals on which communication data is encoded) and a device such as a mobile and/or handheld device and/or mobile user device and/or IoT device. Optical wireless communications may be provided between the transmitter, receiver and/or transceiver associated with the object and an access point, transmitter and/or transceiver (which may be comprised in a light fitting, or the like) for providing the radiation signals on which communication data is encoded. Any appropriate form of communication may be provided between the transmitter, receiver and/or transceiver associated with the object and the mobile and/or handheld device and/or mobile user device and/or IoT device. For example, said communication may be provided by any appropriate protocol, and/or may be provided by any appropriate communication system such as: wired/cable (e.g. USB, or the like), RF wireless and/or optical wireless communications, or the like.

The radiation signal(s) may comprise or encode data, such as digital data, or have digital data encoded on them, e.g. using techniques such as M-QAM, OOK, PAM, and/or the like.

The device may be generally cuboid. The device may comprise a first or front surface, which may be an operating surface, which may comprise a screen or main screen, such as a touch screen. The device may comprise a second or back surface, which may be a surface of the device that is opposite the first or front surface. The edges or side of the device may extend between the first and second surfaces. The perimeter or periphery of the device may extend around the edges or sides and/or around the perimeter of the first or second surfaces.

The optical radiation may be electromagnetic radiation. The radiation may be non-radiofrequency (RF) radiation. The optical radiation may be radiation above 300 GHz, for example, by making use of at least one of optical communication in at least the following parts of the electromagnetic spectrum: microwave, Terahertz, infrared, visible, ultraviolet, X-ray, and gamma rays. It will be understood that the 300 GHz boundary is merely exemplary and different boundaries may be defined between optical and RF frequency bands. For example, the boundary between optical and RF frequencies may be defined as 25 GHz, 50 GHz, 100 GHz, 150 GHz, 200 GHz, 250 GHz, 300 GHz, 350 GHz, 400 GHz, 500 GHz, 600 GHz, 700 GHz, 800 GHz, 900 GHz, 1 THz, 2 THz, 5 THz, 10 THz, 20 THz, 50 THz, 100 THz, 200 THz, 500 THz, 1 PHz, or indeed any other suitable frequency. The receiver may be an optical receiver.

The receiver may be configured to at least partially or wholly cover at least one, e.g. two, three or four sides of the mobile device. The receiver may be provided or configured to be mounted around an outer periphery or edge of the mobile. The receiver may be generally quadrilateral, such as rectangular, or quadrilateral but for curved or radiused corners, for example in a plan view or planar cross section.

The receiver may define an opening, e.g. within the quadrilateral. The first or front surface, e.g. the operating surface, which may comprise a screen, e.g. touch screen, of the mobile device may be accessible via the opening. The opening may extend through the receiver, e.g. so that the screen and at least part or a majority of the back of the mobile device are accessible via the opening. Alternatively at least part or all of the first or front surface and/or the second or back surface of the device may be covered or partially covered by the receiver. The guide and/or one or more receiver elements may be provided on, extend at least partially or wholly over or may be distributed over the first or front and/or second or back sides of the device, in use. At least a portion of the receiver, such as that covering the first or front surface in use, may be transparent (at least in the visible light region)

The receiver may be comprised in at least one, e.g. two, three, four or more separate parts, which may be assembled or fixable together. The receiver may extend around at least part of one or more or all sides or edges of the mobile device. The receiver may comprise at least one, e.g. two, three or four, sides or sections, which may be arranged perpendicularly to at least one or each other. Two of the sides or sections may be longer than two other of the sides or sections. The sections, may form or be configured to form a quadrilateral, e.g. when assembled.

The receiver elements may be distributed over at least one, e.g. two, three, four or more sides or sections of the receiver and/or the corners or junctions therebetween. The receiver elements may be distributed over at least one, e.g. two, three, four or more sides or edges and/or corners of the mobile device in use. The receiver elements may be configured to receive the radiation signals on at least one, e.g. two, three, four or more sides or edges and/or corners of the mobile device in use. At least one or the receiver elements may be configured to receive radiation signals from the front and/or back of the device, in use.

At least one receiver element may be provided on and/or configured to receive the radiation from at least one corresponding side or section of the receiver. At least one receiver element may be provided at, and/or configured to receive the radiation from, substantially the centre or middle or at least one or more or each side or section of the receiver. At least one receiver element may be provided at, and/or configured to receive the radiation from, substantially the centre or middle or at least one or more or each corner or junction between sides or sections of the receiver.

The receiver may be a concentrator, which may be configured such that, in use, it exceeds the étendue conversion, e.g. the product of an exit aperture area of the receiver and the solid angle of the output of the receiver may be greater than the product of the area of an entrance of the receiver and the solid angle of acceptance of the receiver.

The receiver may comprise or be configured to communicate with a signal processor. The signal processor may be configured to distinguish between received signals, e.g. depending on which respective receiver element or section, side, edge or corner of the receiver the respective signals are received by.

The signal processor may be configured to combine signals from a plurality of receiver elements or groups of receiver elements, such as at least two, at least three, at least four or at least five receiver elements, e.g. receiver elements or groups of receiver elements located on or associated with different sides or sections or corners of the receiver and/or on different edges or sides and/or corners of the periphery of the device in use. The signal processor may be configured to average, sum, normalise or otherwise combine the optical signals from one or more receiver elements or groups of receiver elements or receiver elements within a group. The combination may selectively prioritise and/or adjust the contribution from selected receiver elements or groups of receiver elements, e.g. dependent on or to optimise gain, signal intensity, signal to noise ratio and/or other suitable signal quality metric. The signal processor may be configured to combine signals from the receiver elements or groups of receiver elements using equal gain combining, select best combining, optimal combining and/or maximum ratio combining and/or the like.

The guide (e.g. the optically active material thereof) may be configured to emit different wavelengths (e.g. colours) of re-emitted radiation signal at different locations on, or for different sections of, the guide e.g. for different sides or sections or corners of the receiver and/or on different edges or sides and/or corners of the periphery of the device in use. The signal processor may be configured to implement wavelength division multiple access based on the different wavelengths. The signal processor may be configured to decode the data contained in the radiation signal using wavelength division multiple access (WDMA), e.g. based on the different wavelengths of re-emitted radiation. The radiation signals may comprise multiple streams of data, with respective radiation signals and/or streams of data being transmitted on different wavelengths and/or from different locations that are converted to different wavelengths depending on which location or section of the receiver receives the radiation signal. Individual streams or multiple streams of data or radiation signals of a given wavelength may be for a given device. Different streams may be for different devices.

At least one or each receiver element may be configured to detect or preferentially detect radiation at a different wavelength/colour to at least one or each other receiver element. One or more or each receiver element associated with at least one or each section, side, edge and/or corner of the receiver may be configured to detect or preferentially detect radiation at a different wavelength/colour to one or more or each receiver element associated with at least one or each other section, side, edge and/or corner of the receiver.

The signal processor may be configured to perform interference management. The signal processor may be configured to distinguish between radiation signals received from different transmitting devices, e.g. depending on the location on the receiver at which the radiation signal is received, the receiver element that receives the signal and/or the section of the receiver that receives the signal. The signal processor may be configured to extract signals associated with individual transmitting devices, e.g. by cancelling, subtracting, and/or another suitable mathematical operation. The receiver may be configured to selectively activate receiver elements associated with, and/or most strongly receiving a signal from, a desired or target transmitting device or radiation signal. The receiver may be configured to selectively deactivate receiver elements associated with, and/or most strongly receiving a signal from, at least one undesired or non-target receiver element. The receiver may be configured to cancel, disregard or remove interfering signals, or deactivate receiver elements most strongly receiving interfering signals. The interfering signals may be signals from non-target transmitting devices.

The receiver may comprise one or more optical power convertors or solar cells, such as photovoltaic devices. The receiver may be configured to harvest or draw power from the one or more receiver elements and/or the one or more optical power convertors, e.g. from optical radiation such as the optical radiation signals and/or background radiation such as solar radiation, which may be received via the guide, particularly when the guide is configured as an optical concentrator.

The receiver maybe be substantially confined to the periphery and/or perimeter of the mobile device, e.g. leaving at least all, or a majority of or at least 80%, 90% or more of the front or first and/or the second or back surfaces exposed and/or uncovered by the receiver.

In alternative embodiments, at least part of the receiver may extend over at least part or all of the first or front surface and/or the second or back surface of the mobile device. One or more of the receiver elements may be provided on the first or front surface. One or more of the receiver elements may be provided on the second or back surface. At least part of the guide may extend over at least part or all of the front or first and/or the second or back surface.

According to another example of the present disclosure there is provided a device, such as a handheld and/or portable communications device, comprising or provided with the communications receiver of the previous example.

According to an example of the present disclosure there is provided a communication system comprising at least one transmitter for transmitting the radiation signals on which communication data is encoded and at least one device according to the previous example for receiving at least one or each of the radiation signals.

The transmitter may comprise or be comprised in an optical wireless communications transmitter. The transmitter may comprise one or more light emitters, such as LEDs, laser diodes, lasers, incandescent bulbs, OLEDs, LCDs and/or the like, for emitting at least one of the radiation signals. The transmitter may be configured to modulate or otherwise modify emitted radiation so as to encode data such as digital data or other computer readable to thereby form the radiation signal.

According to an example of the present disclosure is a method of receiving communications data using a communications receiver according to the first example. The method may comprise receiving radiation signals using the receiver, e.g. on at least part of one, two or more edges or sides and/or corners of the periphery of the device. The method may comprise receiving one or more optical signals at a plurality of receiver elements of the receiver.

According to an example of the present disclosure is a signal processor configured to operate as described above in relation to any of the above examples.

According to an example of the present disclosure is a method of processing signals using the signal processor of the above example.

The signal processor may be configured to combine signals from a plurality of receiver elements or groups of receiver elements, e.g. receiver elements or groups of receiver elements located on different sides or sections or corners of the receiver and/or on different edges or sides and/or corners of the periphery of the device in use. The signal processor may be configured to average, sum, normalise and/or otherwise combine the optical signals from one or more receiver elements or groups of receiver elements or receiver elements within a group. The combination may selectively prioritise and/or adjust the contribution from selected receiver elements or groups of receiver elements, e.g. dependent on or to optimise gain, signal intensity, signal to noise ratio and/or other suitable signal quality metric. The signal processor may be configured to combine signals from the receiver elements or groups of receiver elements using equal gain combining, select best combining, optimal combining and/or maximum ratio combining and/or the like.

The signal processor may be configured to implement wavelength division multiple access based on the different wavelengths. The signal processor may be configured to decode the data contained in the radiation signal using wavelength division multiple access (WDMA), e.g. based on the different wavelengths of re-emitted radiation.

The signal processor may be configured to distinguish between received signals, e.g. depending on which respective receiver element or section, side, edge or corner of the receiver the respective signals are received by.

The signal processor may be configured to perform interference management. The signal processor may be configured to distinguish between radiation signals received from different transmitting devices, e.g. depending on the location on the receiver at which the radiation signal is received, the receiver element that receives the signal and/or the section of the receiver that receives the signal. The signal processor may be configured to extract signals associated with individual transmitting devices, e.g. by cancelling, subtracting, and/or the like. The receiver may be configured to selectively activate receiver elements associated with, and/or most strongly receiving a signal from, a desired or target transmitting device. The receiver may be configured to selectively deactivate receiver elements associated with, and/or most strongly receiving a signal from, an undesired or non-target receiver elements. The receiver may be configured to cancel, disregard or remove interfering signals, or deactivate receiver elements most strongly receiving interfering signals. The interfering signals may be signals from non-target transmitting devices.

According to an example of the present disclosure is a computer program product that, when run on a processor or processing device causes the processing device to implement the signal processor of the previous example.

It should be understood that the features defined above in accordance with any example or below in relation to any specific embodiment may be utilised, either alone or in combination with any other defined feature, in any other example or embodiment of the invention. Furthermore, the present invention is intended to cover apparatus configured to perform any feature described herein in relation to a method and/or a method of using or producing or manufacturing any apparatus feature described herein.

The invention may be performed by or may utilise one or more programmable processors executing a computer program to perform functions of the invention by operating on input data and generating output. Method steps can also be performed by special purpose logic circuitry, e.g., an FPGA (field programmable gate array) or an ASIC (application-specific integrated circuit) or other customised circuitry. Processors suitable for the execution of a computer program include CPUs and microprocessors, and any one or more processors. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g. EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a device having a screen, e.g., a CRT (cathode ray tube), plasma, LED (light emitting diode) or LCD (liquid crystal display) monitor, for displaying information to the user and an input device, e.g., a keyboard, touch screen, a mouse, a trackball, and the like by which the user can provide input to the computer. Other kinds of devices can be used, for example, feedback provided to the user can be any form of sensory feedback, e.g., visual feedback, auditory feedback, or tactile feedback; and input from the user can be received in any form, including acoustic, speech, or tactile input.

BRIEF DESCRIPTION OF THE DRAWINGS

These and other examples of the present disclosure will now be described by way of example only and with reference to the following drawings, in which.

DETAILED DESCRIPTION

One of the challenges in implementing optical wireless communications, including visible light communications (VLC) or light fidelity (LiFi) in mobile hand-held devices is in collecting sufficient optical power to achieve a reliable communication. In State-of-the-art approaches in implementing LiFi for mobile applications, direct and diffused illumination is focused on a very small photodetector (PD) located at a point of interest on the mobile device body. AS long as the mobile device is pointing upwards so that the photodetector faces in the direction of the light source, the system may work. However, in view of the required mobility and flexibility of mobile devices and the directionality of the light sources, it would be preferable to adequately collect the optical communications signals for different orientations and tilts of the mobile device. Therefore, the LiFi solution for mobile communications should support a wide field of view (FOV) and a large light collection area.

However, the electrical capacitance of photodetectors increases as the active area of PDs increases. As such, the detection area of a PD is inversely-proportional to the PD bandwidth. Therefore, in order for LiFi to fulfil its promise of high speed communications, the PDs used are preferably small in size (e.g. in the order of few hundred micrometres).

Optical lenses can be used to focus most of the incident light into the detection area of the photodetector. However, this comes at the expense of decreasing the FOV, which makes it impractical for use in LiFi mobile applications. Light steering and active tracking of users may support mobile communications. However, this approach may be complex and may not be an option from an illumination point of view for VLC.

Using a large number of PD(s) on the mobile device body is very challenging for the light collection process. The less number of PDs in this scenario, the higher the likelihood of light blockage. Any blockage could terminate or seriously degrade the connection. Increasing the number of PDs at particular points of interest At least one example described herein seeks to provide an optical receiver having a wide field of view and capable of high bandwidth. At least one example is a lens-less implementation without optical tracking.

Figure 1:
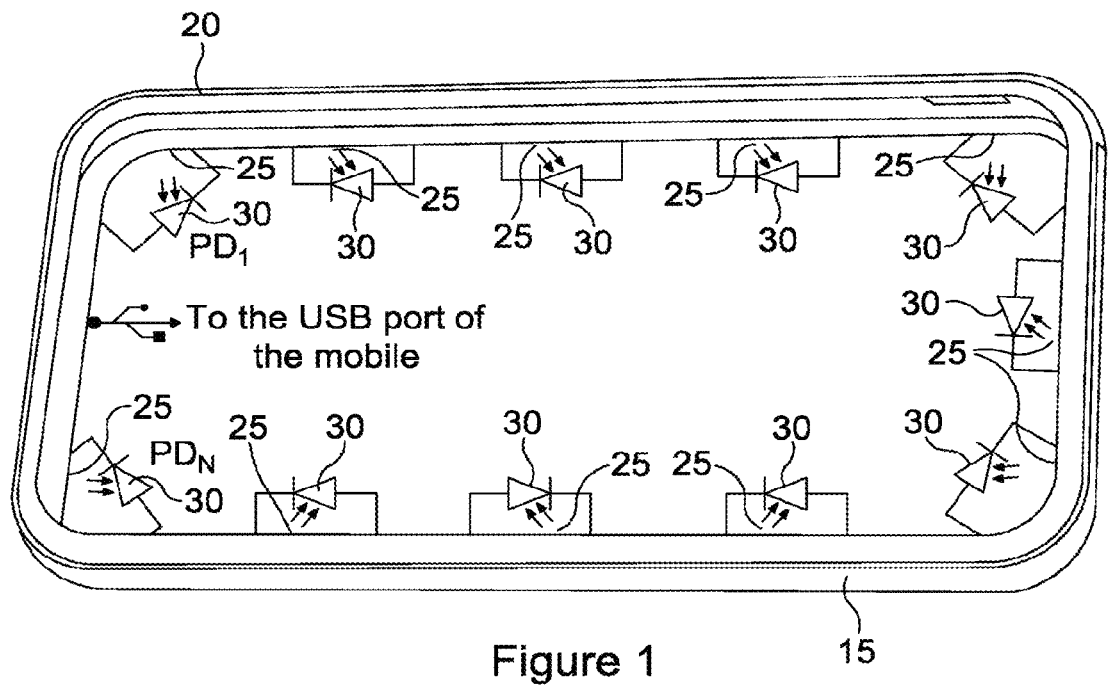
FIG. 1 shows a perspective view of an example of a wireless optical communications receiver.
Figure 2:
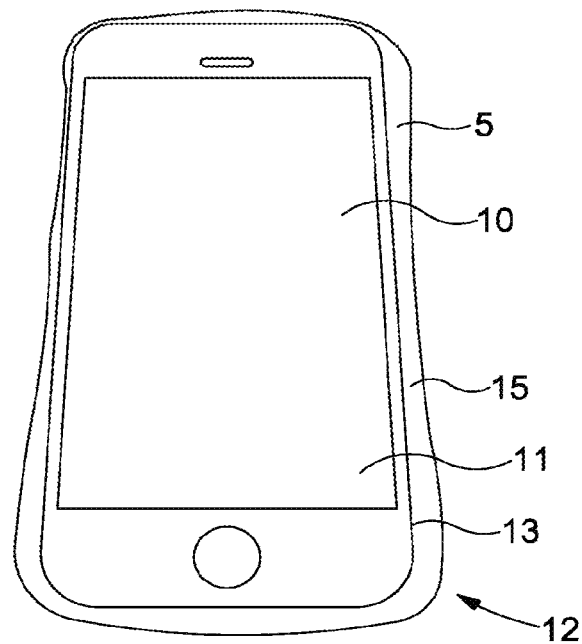
FIG. 2 shows a schematic of the receiver of FIG. 1 in use.

FIG. 1 shows a wireless optical communications receiver 5 that is configured to fit to the perimeter or periphery of a mobile communication device such as a smartphone, smart watch, tablet, phablet, PDA, gaming device, or the like. For example, the receiver 5 can be incorporated in a case or bumper for fitting or retro-fitting to the device, as shown in FIG. 1 or the receiver 5' can be provided on or incorporated into the periphery or perimeter of the device 10 as shown in FIG. 2.

The receiver comprises an optical guide 15 that is configured to extend at least part, and in this example most or substantially all, of the way around the periphery of the device 10.

The device 10 has an operating surface 11 that comprises a touch screen and user facing camera, a back surface 12 on an opposite side of the device 10 to the operating surface 11 and an edge 13 that extends between the operating surface 11 and the back surface 12. The edge 13 is generally perpendicular to the front and back surfaces 11, 12 and runs round the perimeter of the operating surface 11 and the back surface 12. The device 10 in this example is generally cuboid but it will be appreciated that the edges and corners may be chamfered, bevelled, scalloped or otherwise rounded or shaped. The edge 13 runs around all four sides of the device. The receiver 5 is provided on and follows/conforms to the shape of the edge 13. Particularly, the receiver is configured as an extension of the shape of the edge 13 of the device 10. Although a specific example of a device 10 is shown in FIG. 2 and described above, it will be appreciated that the present invention is not limited to this, and a variety of types, shapes and sizes of device could be used. With respect to the examples described herein that are removable or retrofittable, retrofit cases or bumpers for mobile user devices such as smartphones and tablets are well known and a skilled person would clearly understand that differently dimensioned and shaped cases or bumpers are required to fit round the periphery or perimeter of different devices 10. As such, although the size and shape of such cases or bumpers can vary, the general features and mechanism for mounting the case or bumper like receiver would be readily apparent to a person skilled in the art.

The receiver 5 and its optical guide 15 in this example extends almost entirely around the perimeter of device 10. However in some examples the receiver 5 and/or optical guide 15 only extend part of the way around the perimeter of the device 10. In the example shown, the guide 15 is provided in several sections 15a, 15b, 15c and 15d. Particularly, respective sections 15a, 15b, 15c and 15d of the guide 15 extend along respective sides of the receiver 5. However, again, it will be appreciated that the guide 5 may comprise different number of sections, such as one, two, three or more sections, and that different sections need not necessarily correspond to sides of the receiver 5 and could additionally or alternatively correspond to corners or parts of a side, for example.

The guide 15 is configured as a combined optical collector, guide and concentrator, and is configured to receive optical wireless communication signals, concentrate the signals and convey the signals along the guide 15. The guide 15 receives light at a relatively large input surface 20 and guides the light to a smaller output surface 25. In a particular example, the guide 15 comprises fluorophores (not shown) that are, for example, provided within the matrix or substrate forming the guide 15 or coated on inward facing surfaces of the guide 15. The matrix or substrate of the guide 15 may be glass or another suitable optically clear crystalline material or a polymeric material, such as Perspex or other suitably optically clear plastic. The fluorophores are configured to absorb the radiation carrying the signals and re-emit radiation with a different (usually longer) wavelength and in a random direction. The guide 15 is configured such that the majority of the light re-emitted by the fluorophores is retained within the guide 15, e.g. by total internal reflection. Optionally at least part of the guide can be coated with a reflective material for reflecting the re-emitted radiation back into the guide 15. The input surfaces 20 are optionally provided with an anti-reflective coating to assist collection of the optical signals. Preferably, the reflective coating is reflective in one direction or the reflectivity is biased in one direction, at least on the input surface, in order to more freely admit radiation that is incident on the guide 15 from out with the guide 15 whilst reflecting radiation within the guide 15 back into the guide 15. The fluorophores can be configured to absorb the radiation forming the optical signals at specific wavelengths. Since the re-emitted radiation is at a different wavelength, it can pass along the guide 15 without being re-absorbed, until it is emitted from the guide via an output surface 25. It will be appreciated that no reflective coating is provided on the output surfaces 25.

The input surface corresponds to an outer surface of the guide 5, extending generally around, and facing outwardly from, the perimeter of the device 10. The guide comprises a plurality of output surfaces 25 through which the signals collected by the sections 15a, 15b, 15c, 15d, of the guide 15 are emitted to a corresponding respective receiver element 30, such as an avalanche photodiode or PIN junction, that is provided facing, adjacent or abutting the associated output surface 25. The receiver elements 30 and associated output surfaces 25 are provided on an inner side of the guide, arranged towards the device 10. The optimal number and/or locations of the receiver elements 30 and output surfaces 25 can be determined by techniques such as ray-tracing, using simulation packages such as Zeemax and MATLAB. The receiver elements 30 and associated output surfaces 25 are distributed around the receiver 5 and different receiver elements 30 are configured to receive optical signals that are collected by the different sections 15a, 15b, 15c and 15d of guide 15. In this way, the receiver 5 is able to discriminate between optical signals received at the different sections 15a, 15b, 15c, 15d of the guide 15 provided at different regions around the receiver 5, including from parts of the receiver 5 on different sides of the device 10, and different portions of each side and/or at corners of the device 10/receiver 5.

Optionally individual receiver elements 30 can be configured to absorb radiation at different wavelengths. For example, the receiver elements 30 can be configured to preferentially absorb or detect radiation having a wavelength corresponding to the radiation re-emitted by the fluorophores of the corresponding section 15a, 15b, 15c and 15d of the guide 15. This may improve the ease of determining which radiation signals were received at which section 15a, 15b, 15c and 15d of the guide 15.

The receiver elements 30 are connected to collection electronics. The collection electronics can optionally comprise a processor and memory that in an example are operable to implement a signal processor to at least partially perform signal processing on the received signals form the receiver elements 30 or may additionally or alternatively be configured to communicate the signals via a data port such as a mini-USB, lightning or other suitable data port to a processor and memory of the device 10, which is optionally configured to processes the signals detected by the receiver elements 30, e.g. by being suitably programmed by an app or other computer program product. In this way, the collection electronics on the receiver, the processor on the device, and/or optionally a remote data processing facility that can be connected to the device via a network such as the internet or any combination thereof can implement a signal processor for processing the signals received by the receiver elements 30.

The receiver 5 having a shape corresponding to the shape of the perimeter or periphery of the device 10 has been found to provide very beneficial light collection characteristics, being able to effectively collect optical wireless communications signals from a wide range of directions and providing a wide overall field of view. This arrangement is particularly beneficial, for example, in systems in which an optical wireless access point 35 is provided in an elevated position (see e.g. FIG. 3), such as on a ceiling, as a typical user holding the device 10 with the receiver 5 in their hand and interacting with the operating surface 11 tends to orient at least part of the edge 13 of the device 10 and thereby a part of the receiver 5 towards the optical wireless access points, thereby improving reception, in a variety of common user hand positions.

The electrical capacitance of a receiver element tends to increase with size. Increasing capacitance tends to reduce the response time of the receiver element. As such, in systems having large receiver elements to collect radiation over a large field of view, the large size of the receiver elements tends to reduce the response rate of the receiver element and thereby the bandwidth. However, by providing the concentrating guide 15, particularly in the shape that extends around at least part of the perimeter or periphery of a hand held device 10, a large overall field of view is provided whilst maintaining responsiveness and bandwidth of small receiver elements 30. In particular, radiation signals can be collected from around the perimeter or the device 10 and guided by the guide to a corresponding receiver element. The use of fluorophores in the internally reflecting guide 15 and the provision of input surfaces 20 that have a higher surface area than the output surfaces 25 allow efficient concentration of the signals, which may improve the signal to noise ratio. The wavelength shifting properties of the fluorophores and the provision of a plurality of receiver elements may provide discrimination between signals received at different locations on the receiver 5.

Furthermore, since the guide 15 is segmented into sections 15a, 15b, 15c and 15d, each section having corresponding receiver elements 30 and optionally having differently configured fluorophores (e.g. with different molecular structures) re-emitting at different wavelengths, the receiver 5 can have a useful directional sensitivity.

In addition to the above benefits, the properties of the receiver can be beneficially exploited, for example, to utilise advanced signal processing techniques, for improving signal recovery such as by improving signal-to-noise ratio and/or the like. For example, the receiver 5 can be used to provide multiple access using wavelength division multiple access (WDMA), provide interference mitigation and provide optical power, amongst other advantages.

Figure 3:
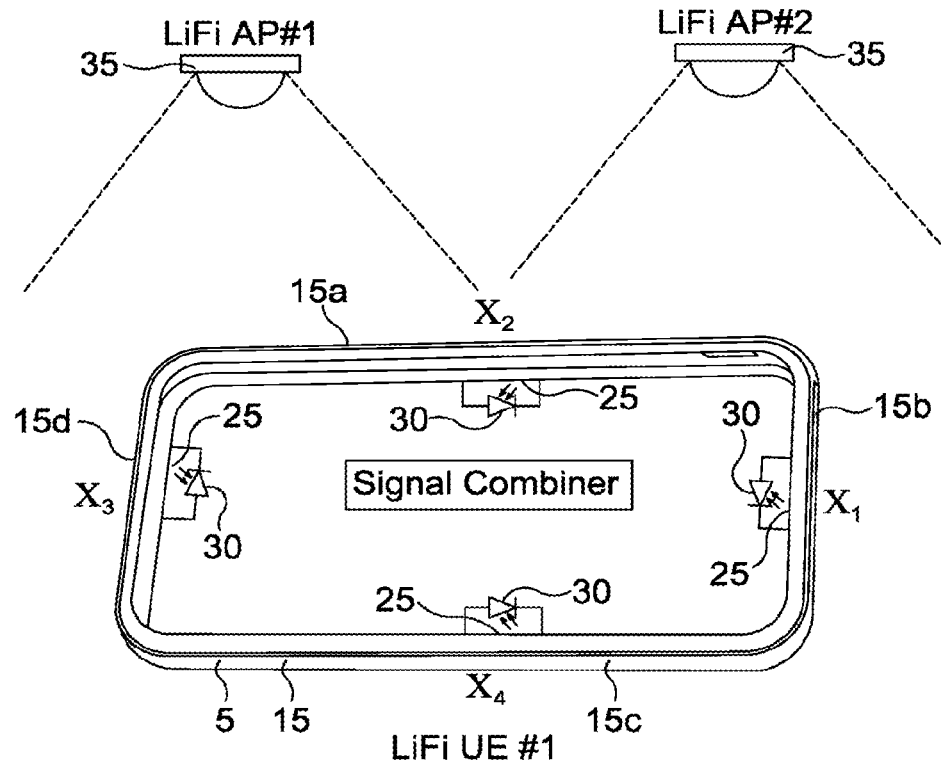
FIG. 3 is an illustration of a signal processing operation.

For example, as shown in FIG. 3, since multiple spaced receiver elements 30 are provided distributed over a variety of spatial positions and/or orientations, the outputs of a plurality of receiver elements 30 can be combined to derive an improved overall signal and improve the spatial diversity of the receiver 5. In particular, the outputs of the plurality of receiver elements 30 can be combined by techniques such as averaging, equal gain combining, select best combining, optimal combining, maximum gain combining and/or the like.

Figure 4:
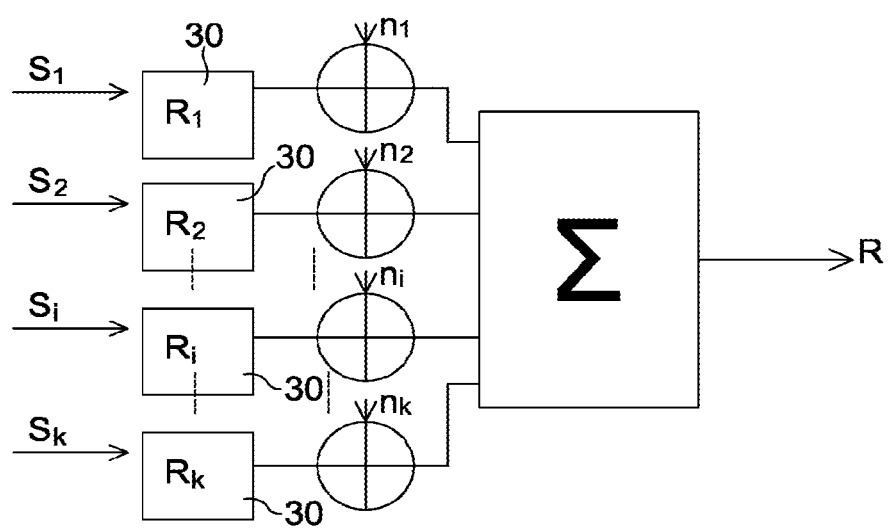
FIG. 4 shows another schematic of the receiver of FIG. 1 in use.

In an example, with reference in FIG. 4, respective optical wireless communication signals $S1, S2, \ldots, Si, \ldots, Sk$ are received by respective receiver elements 30 $R1, R2, \ldots, Ri, \ldots, Rk$. Each signal detected by the respective receiver elements 30 $R1, R2, \ldots, Ri, \ldots, Rk$ is affected by an associated noise component $n1, n2, \ldots, ni, \ldots, nk$. If the plurality of receiver elements 30 $R1, R2, \ldots, Ri, \ldots, Rk$ are provided with substantially the same optical signal (i.e. $S1=S2=\ldots Si=\ldots Sk$), and the output of each detector is summed and normalized (or averaged or otherwise combined) to generate an overall signal R then, as the number k of receiver elements 30 increases, the noise component of the overall signal R decreases, tending to zero as k tends to infinity. In this way, the signal-to-noise ratio may be improved.

Although this technique is particularly beneficial to the receiver 5 described above, it will be appreciated that it is applicable generally to other optical wireless communications receivers having a plurality of spatially and/or angularly distributed receiver elements and does not necessarily need to have the guide 15 nor even need to be shaped to conform to the perimeter of a device 10. As such, it will be appreciated that examples of receiver are not limited to having a guide or being shaped to minor the shape of the perimeter of the device, although the receiver 5 having these features in combination with the signal combining techniques described above may be particularly beneficial.

As indicated above, the signal combining can be performed by the signal processor, for example, as implemented using the signal collection electronics, the processor of the device, a remote processing facility and/or any combination thereof, or any other suitable data processing arrangement.

Figure 5:
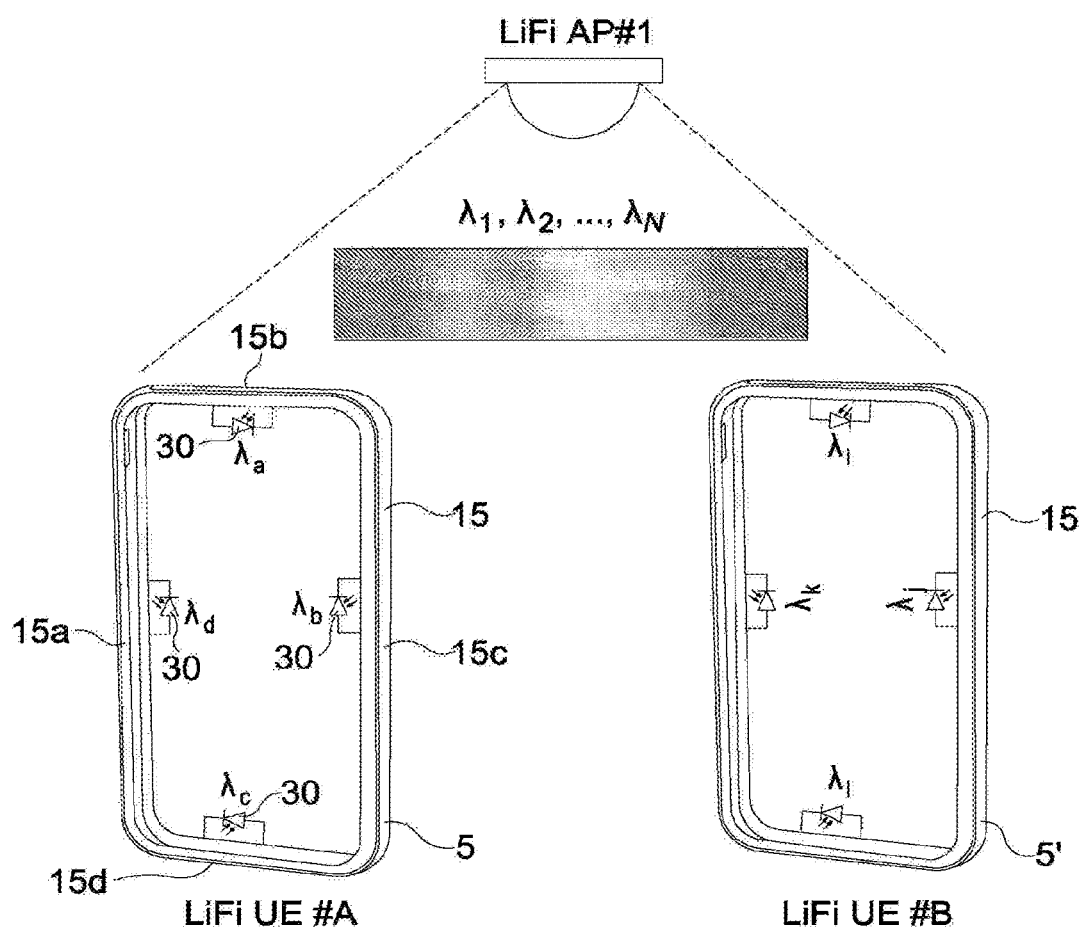
FIG. 5 shows another schematic of the receiver of FIG. 1 in use.

In another example, the receiver 5 can be utilized to provide wavelength division multiple access (WDMA). In particular, since each section 15a, 15b, 15c, 15d of the guide 15 comprises fluorophores that re-emit in different wavelengths (i.e. colours), the distinctive wavelengths can be utilised to implement WDMA. An example of this is illustrated in FIG. 5, which shows an optical wireless access point 35 that emits different optical signals/data streams at different frequencies. In particular, since white light contains a spectrum of frequencies, access points that emit "white light" can be used to encode a large number of signals/data streams at different frequencies that together give the appearance of white light. This arrangement can be used to provide different data streams/signals to different users wherein the frequency is specific to a given device (e.g. for increased security) or two or more data streams can be aggregated to a given device to provide increased data rate.

Figure 6:
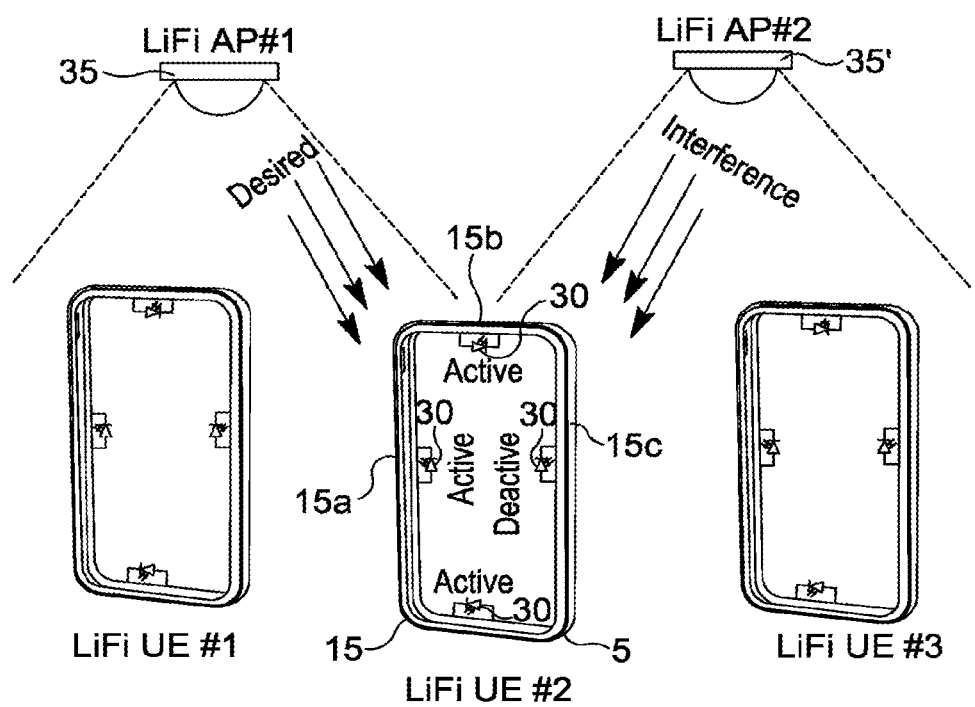
FIG. 6 shows another schematic of the receiver of FIG. 1 in use.

Another potentially beneficial application of the receiver 5 is in implementation of interference management. As illustrated in FIG. 6, a given receiver 5 can receive signals from a desired transmitter (such as an optical wireless access point 35 or another device 10) and also from one or more other (interfering) transmitters, such as optical wireless access point 35'.

In this case, certain sections 15a of the guide 15 and/or certain receiver elements 30 receive more of the signal from the desired transmitter 35 and less of the signal from the interfering transmitter(s) 35' and certain other sections 15c of the guide 15 and/or certain other receiver elements 30' receive less of the signal from the desired transmitter 35 and more of the signal from the interfering transmitter(s) 35'. In this way, the signal from the desired transmitter 35 can be maximised, e.g. by mathematically subtracting or otherwise removing the signal from the receiver element 30' from the signal from receiver element 30 or by selectively switching off or disregarding the data from the receiver element 30', or the like.

Figure 7:
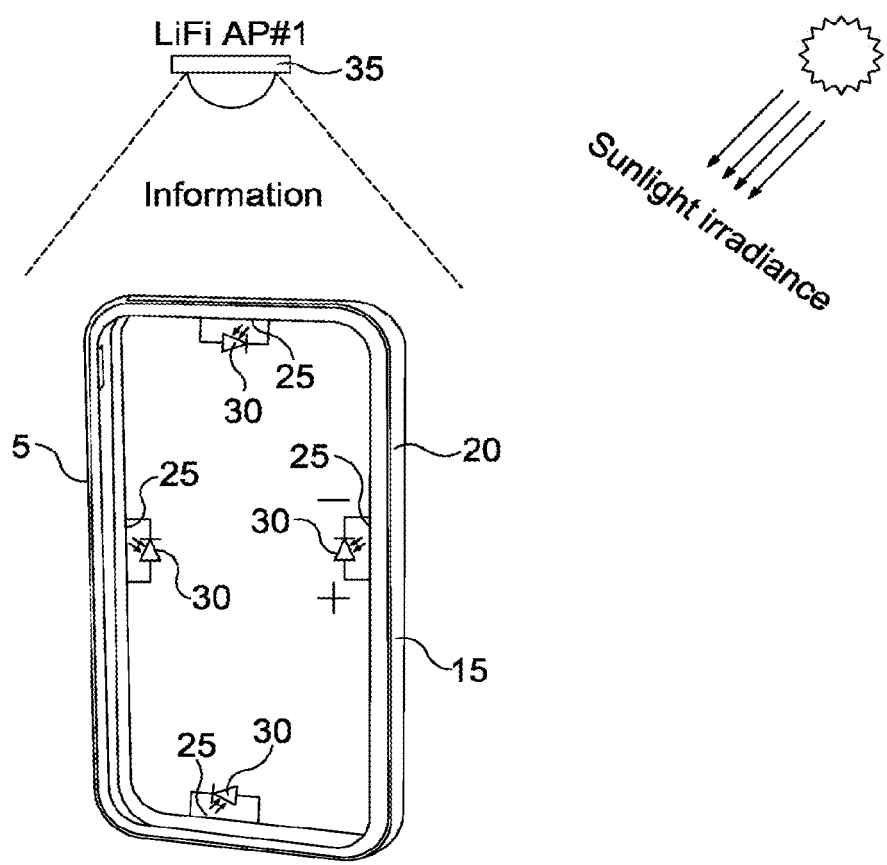
FIG. 7 shows a flowchart of a signal processing method.

In another example illustrated with respect to FIG. 7, the optical power collected by the receiver elements 30, 30' and/or by photovoltaic or other solar panels or other transducers can be used to power the receiver 5, e.g. the collection electronics. The optical concentrating properties of the guide 15 are particularly beneficial in this regard. In this way, the receiver 5 can be powered or partially powered without unduly draining the battery of the device.

Although particularly beneficial examples are described above, it will be appreciated that the invention is in no way limited to these examples.

For example, although certain exemplary shapes of the receiver 5 are provided, it will be appreciated that the receiver may take any shape or size that confirms with the perimeter around the edge of a suitable hand help mobile communication device.

Although an example of a guide/optical concentrator 5 beneficially having fluorophores and reflective and non-reflective coatings, it will be appreciated that these are not essential and that other optical/light guides and concentrators, such as those relying only on shape, material and/or total internal reflection, and/or conventional reflection or otherwise may be used.

Figure 8:
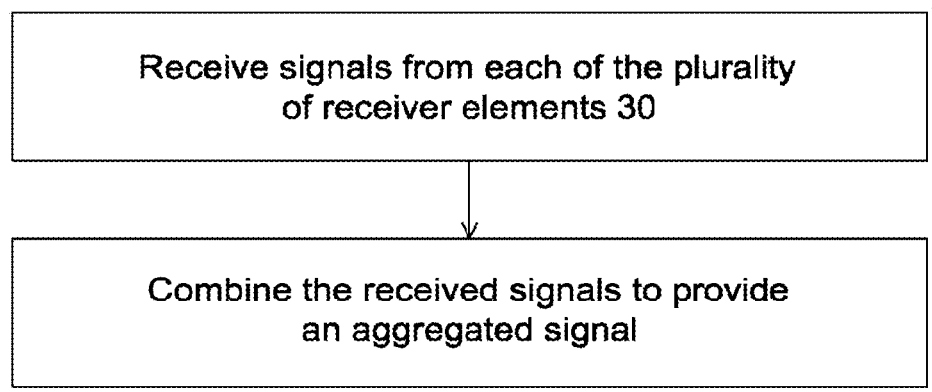
FIG. 8 is a flowchart illustrating combining of signals described in relations to FIGS. 3 and 4.

In addition, various signal processing functions are described above, and it will be appreciated that these may be carried out by a signal processor partly or fully implemented in collection electronics on-board the receiver, the processor on the device (utilising a data connector of the receiver that connects to a data port in the device), or a remote data processing facility and/or any combination of the above. It will be appreciated that the signal processor may be at least partly implemented in hardware and/or at least partly implemented in software. A flowchart showing the signal combining described above in relation to FIGS. 3 and 4 is illustrated in relation to FIG. 8. In particular, the signal processor receives signals from each of the plurality of receiver elements 30 and combines these, for example using summing and normalisation, averaging and/or the like, to provide an aggregated or overall signal.

Although examples of the receiver 5 described above have a guide and are conformed or shaped to the perimeter of a device, it will be appreciated that this need not be the case, and instead the receiver may simply comprise a plurality of receiver elements and a signal processor configured to perform signal combining or one of the other techniques described in relation to any of FIGS. 3 to 8.

Furthermore, although a specific type of light guide 15 is described, it will be appreciated that other types of light guide could be used. For example, rather than having fluorophores in a matrix, the light guide may comprise a purely internally reflecting light guide, or a bundle of scintillating optical fibres, or other optical guide arrangement that would be apparent to a skilled person. Furthermore, although various examples show receiver elements in specific locations, it will be appreciated that other numbers of receiver elements and/or locations of receiver elements could be used.

As such, the above examples are provided for illustration only and the invention is defined by the claims.

Certain embodiments are in accordance with the following numbered clauses.

Clause 1. An optical wireless communications receiver for a portable communications device, the receiver being configured to receive radiation signals on which communication data is encoded, wherein the receiver is comprised in or on or configured for mounting to at least part of a periphery or edge of the device.

Clause 2. The optical wireless communications receiver of clause 1 comprising a plurality of, receiver elements distributed along or around the receiver.

Clause 3. The optical wireless communications receiver of clause 1 or clause 2 comprising an optical guide configured to receive radiation and convey at least part of the radiation along the optical guide to at least one of the receiver elements.

Clause 4. The optical wireless communications receiver of clause 3, wherein the optical guide is, comprises or is comprised in an optical concentrator.

Clause 5. The optical wireless communications receiver of clause 3 or clause 4, wherein the optical guide comprises an optically active material, such as a luminescent, fluorescent or scintillating material, fluorophores, Perovskite and/or Quantum dots.

Clause 6. The optical wireless communications receiver of clause 5, wherein the optically active material is configured to absorb or receive incident radiation signals and re-emit the radiation signals at one or more different wavelengths to the absorbed or received radiation.

Clause 7. The optical wireless communications receiver of any preceding clause, wherein the receiver is configured to at least partially or wholly cover at least one, two, three, four or more sides of the mobile device Clause 8. The optical wireless communications receiver of any preceding clause, wherein the receiver elements are distributed over two or more sides or sections of the receiver and/or the corners or junctions therebetween such that the receiver elements are configured to receive the radiation signals on at least two sides or edges and/or corners of the mobile device in use.

Clause 9. The optical wireless communications receiver of any preceding clause, wherein the receiver comprises or is configured to communicate with a signal processor, wherein the signal processor is configured to:
distinguish between received signals depending on which respective receiver element or section, side, edge or corner of the receiver the respective signals are received by; and/or
combine signals from a plurality of receiver elements or groups of receiver elements in use, e.g. by averaging, summing or otherwise combining the signals from the one or more receiver elements or groups of receiver elements or receiver elements within a group.

Clause 10. The optical wireless communications receiver of clause 9 when dependent on clause 5, wherein the optically active material at different locations on, or for different sections of, the guide is configured to emit different wavelengths of re-emitted radiation and a signal processor is configured to implement wavelength division multiple access and/or distinguish between radiation signals based on the different wavelengths.

Clause 11. The optical wireless communications receiver of clause 9 or any clause dependent thereon, wherein the signal processor is configured to distinguish between radiation signals received from different transmitting devices depending on the location on the receiver at which the radiation signal is received, the receiver element that receives the signal and/or the section of the receiver that receives the signal and further configured to extract signals associated with individual transmitting devices, e.g. by cancelling, disregarding or subtracting signals or by selectively deactivating receiver elements most strongly receiving interfering signals.

Clause 12. The optical wireless communications receiver of any preceding clause, wherein the receiver is configured to harvest or draw power from the one or more receiver elements and/or the one or more optical power convertors.

Clause 13. A handheld and/or portable communications device, comprising or provided with the communications receiver of any of clauses 1 to 12.

Clause 14. A communication system comprising at least one transmitter for transmitting the radiation signals on which communication data is encoded and at least one device according to clause 13 for receiving at least one or each of the radiation signals.

Clause 15. A method of receiving communications data using an optical wireless communications receiver according to any of clauses 1 to 12, the method comprising receiving radiation signals using the receiver at a plurality of receiver elements of the receiver.

Clause 16. A signal processor configured to receive optical wireless communication signals from each of a plurality of optical wireless communication receiver elements or groups of receiver elements and combine the received signals to provide an aggregated or combined signal.

Clause 17. The signal processor of clause 16, configured to average, sum, and/or normalise the optical signals from the plurality of receiver elements or groups of receiver elements or receiver elements within a group to produce the aggregated or combined signal.

Clause 18. The signal processor of clause 16 or clause 17, wherein the plurality of receiver elements or groups of receiver elements include receiver elements or groups of receiver elements located on or associated with different sides or sections or corners of the receiver and/or on different edges or sides and/or corners of the periphery of a device.

Clause 19. A system comprising an optical wireless communications receiver having a plurality of receiving elements for receiving an optical wireless communications signal and a signal processor according to any of clauses 16 to 18 for combining the signals from the plurality of receiving elements to provide an aggregated or combined signal.

Clause 20. The system of clause 19, wherein the optical wireless communications receiver is a receiver according to any of clauses 1 to 12.

Clause 21. A computer program product that, when run on a processor or processing device causes the processing device to implement the signal processor of any of clauses 16 to 20.

The invention claimed is:

1. An optical wireless communications receiver for a communications device, the optical wireless communications receiver being configured to receive optical radiation signals from different optical transmitting devices on which communication data is encoded, wherein:
the communications device comprises a first surface and a second surface, and at least one of a perimeter edge or a perimeter side of the communications device which extends between the first surface and the second surface, wherein at least one of a perimeter or a periphery of the communications device extends around at least one of the perimeter edge or the perimeter side, and around the perimeter of at least one of the first surface or the second surface of the communications device;
the optical wireless communications receiver is comprised at least one of in, on or configured for mounting to at least part of the perimeter edge or the perimeter side or a perimeter corner on the perimeter of the communications device;
the optical wireless communications receiver comprises a plurality of optical receiver elements configured to receive the optical radiation signals and distributed over the optical wireless communications receiver such that in use when the optical wireless communications receiver is at least one of mounted to, comprised in or on the communications device, the plurality of optical receiver elements are distributed over at least one of the perimeter edge or the perimeter side and over a perimeter corner of the communications device or distributed over at least two or more of the perimeter edges, the perimeter sides or the perimeter corners of the communications device;
wherein depending on a location of the optical wireless communication receiver at which the optical radiation signals from the different transmitting devices are received, at least one of the plurality of optical receiver elements is configured to receive a first optical radiation signal and at least one of the plurality of optical receiver elements is configured to receive a second different optical radiation signal, to at least one other of the plurality of optical receiver elements; and
wherein the different optical radiation signal is an interfering optical radiation signal from a non-target optical transmitting device and the optical wireless communication receiver is configured to cancel, disregard, or remove signals from the optical receiver elements receiving the interfering optical radiation signal or to deactivate receiver elements most strongly receiving interfering optical radiation signals.

2. The optical wireless communications receiver of claim 1, further configured to selectively activate receiver elements at least one of associated with or most strongly receiving a signal from, a desired optical transmitting device, a target optical transmitting device or optical radiation signal.

3. The optical wireless communications receiver of claim 1, further comprising an optical guide extending around at least part of the perimeter edge or perimeter side of the communications device when the optical wireless communications receiver is mounted on the communications device, the optical guide being configured to receive the optical radiation signals and convey at least part of the optical radiation signals along the optical guide to at least one of the optical receiver elements.

4. The optical wireless communications receiver of claim 3, wherein at least one of: the optical guide is, comprises or is comprised in an optical concentrator or the optical guide comprises an optically active material that comprises at least one of a luminescent material, fluorescent material, scintillating material, fluorophores, Perovskite or Quantum dots.

5. The optical wireless communications receiver of claim 4, wherein the optical guide comprises the optically active material, and wherein the optically active material is further configured to absorb or receive incident radiation signals and re-emit the optical radiation signals at one or more different wavelengths to the absorbed or received optical radiation signals.

6. The optical wireless communications receiver of claim 1, wherein at least one of: the optical wireless communications receiver is in the form of at least one of a handheld or portable communications device or the optical wireless communications receiver is comprised in a case, cover or bumper that fits or retro-fits to the portable communications device.

7. The optical wireless communication receiver of claim 1, further configured to selectively activate receiver elements associated with, and/or most strongly receiving a signal from, a desired or target optical transmitting device or optical radiation signal.

8. The optical wireless communications receiver of claim 7, further configured to combine signals from the plurality of optical receiver elements or groups of receiver elements in use by averaging, summing or combining the signals from the one or more optical receiver elements or groups of optical receiver elements or receiver elements within a group.

9. A method of receiving communications data by using the optical wireless communications receiver of claim 1, wherein the optical wireless communications receiver is configured to receive optical radiation signals from different optical transmitting devices, the method comprising:
receiving a different optical radiation signal by at least one of the plurality of optical receiver elements of the optical wireless communications receiver to an optical radiation signal received at one or more other optical receiver elements of the plurality of optical receiver elements,
wherein the different optical radiation signal is an interfering optical radiation signal from a non-target transmitting device and depending on a location of the optical wireless communications receiver at which the optical radiation signals from the different transmitting devices are received; and
cancelling, disregarding or removing signals from the optical receiver elements receiving the interfering optical radiation signal or deactivating receiver elements most strongly receiving interfering optical radiation signals.

10. A method of receiving communications data from different transmitting devices using the optical wireless communications receiver of claim 1, the method comprising:
receiving a different data stream of an optical radiation signal by at least one of the plurality of optical receiver elements of the optical wireless communications receiver to a data stream of an optical radiation signal received at one or more other optical receiver elements of the plurality of optical receiver elements; and
distinguishing between received data streams of the optical radiation signals and extracting the signals associated with the different transmitting devices depending on which respective optical receiver element or elements located at different locations on the optical wireless communications receiver the respective data streams of the optical radiation signal are received by,
wherein the plurality of optical receiver elements are configured to receive the optical signals on at least one or more of the perimeter edge or perimeter side and a perimeter corner of the communications device in use,
wherein depending on a location on the optical wireless communication receiver at which the optical signals from the different transmitting devices are received, at least one of the plurality of optical receiver elements is configured to receive a different optical signal, to at least one other of the plurality of optical receiver elements, and
wherein the different optical signal is an interfering optical signal from a non-target optical transmitting device and the optical wireless communication receiver is configured to cancel, disregard, or remove signals from the optical receiver elements receiving the interfering optical signals or to deactivate receiver elements most strongly receiving interfering signals from the non-target optical transmitting device.

11. An optical wireless communications receiver for a communications device, the optical wireless communications receiver being configured to receive optical radiation signals from different transmitting devices on which communication data is encoded, wherein:
the communications device comprises a first surface and a second surface, and at least one of a perimeter edge or a perimeter side of the communications device which extends between the first surface and the second surface,
wherein at least one of a perimeter or a periphery of the communications device extends around at least one of the perimeter edge or the perimeter side, and around the perimeter of at least one of the first surface or the second surface of the communications device;
the optical wireless communications receiver is comprised at least one of in, on or configured for mounting to at least part of the perimeter edge or the perimeter side or a perimeter corner on the perimeter of the communications device;
the optical wireless communications receiver comprises a plurality of optical receiver elements configured to receive the optical radiation signals and distributed over the optical wireless communications receiver, such that in use when the optical wireless communications receiver is at least one of mounted to, comprised in or on the communications device, the plurality of optical receiver elements are distributed over at least one of the perimeter edge or the perimeter side and over a perimeter corner of the communications device or distributed over at least two or more of the perimeter edges, the perimeter sides or the perimeter corners of the communications device;

wherein depending on a location of the optical wireless communication receiver at which the optical radiation signals from the different transmitting devices are received, at least one of the plurality of optical receiver elements is configured to receive a different optical radiation signal, to at least one other of the plurality of optical receiver elements;

the optical wireless communications receiver further comprises a signal processor, wherein the signal processor is configured to distinguish between the optical radiation signals received by the optical wireless communications receiver from the different transmitting devices depending on which optical receiver element or elements of the plurality of optical receiver elements receives the optical radiation signals or portions of the optical radiation signals from the different transmitting devices.

12. The optical wireless communications receiver of claim 11, further comprising an optical guide extending around at least part of the perimeter edge or perimeter side of the communications device when the optical wireless communications receiver is mounted on the communications device, the optical guide being configured to receive the optical radiation signals and convey at least part of the optical radiation signals along the optical guide to at least one of the optical receiver elements.

13. The optical wireless communications receiver of claim 12, wherein the optical guide is, comprises or is comprised in an optical concentrator.

14. The optical wireless communications receiver of claim 13, wherein the optical guide comprises an optically active material that comprises at least one of a luminescent material, fluorescent material, scintillating material, fluorophores, Perovskite or Quantum dots.

15. The optical wireless communications receiver of claim 11, wherein the optical wireless communications receiver is configured to harvest or draw power from the one or more optical receiver elements.

16. The optical wireless communications receiver of claim 11, wherein at least one of: the optical wireless communications receiver is in the form of at least one of a handheld or portable communications device, or the optical wireless communications receiver is comprised in a case or cover or bumper that fits or retro-fits to the communications device.

17. The optical wireless communications receiver of claim 11, wherein the at least part of the optical wireless communications receiver may extend over at least one of: at least part of the first surface, or at least part of the second surface of the communications device.

18. The optical wireless communications receiver of claim 17, wherein the at least part of the optical wireless communications receiver may extend over at least one of: at least part of the first surface, wherein the first surface of the communications device is a front surface, or at least part of the second surface of the communications device, wherein the second surface of the communications device is a rear surface.

19. The optical wireless communications receiver of claim 18, wherein one or more of the receiver elements may be provided at least one of on the first surface or on the second surface.

20. An optical wireless communication device comprising the optical wireless communications receiver of claim 11,
wherein the optical wireless communication device comprises or is comprised in an object,
wherein the object comprises a transmitter configured to relay signals received via the optical wireless communication receiver to another device in the vicinity of or operable to communicate with the object, and
wherein the object is a window, window frame, structural fitting, room or building.

21. The optical wireless communication device of claim 20, wherein the optical wireless communication receiver and transmitter associated with the object is configured to act as a relay or router for radiation signals on which communication data is encoded.

22. The optical wireless communication device of claim 20, wherein the radiation signals are provided by at least one of an access point, a transmitter or a transceiver in the vicinity of or operable to communicate with the object.

23. The optical wireless communications device of claim 20,
wherein the another device comprises at least one of a mobile device, a handheld device, IoT device or mobile user device, and
wherein when the another device comprises the mobile user device, the mobile user device comprises at least one of a mobile phone, smartphone, pda, tablet computer, phablet, laptop, e-book reader, personal computer, electronic game device or smartwatch.

24. The optical wireless communications device of claim 23, wherein the communication provided between at least one of the optical wireless communications receiver or the transceiver associated with the object and at least one of the mobile device, handheld device, mobile user device or IoT device is provided by at least one of wired cable, RF wireless or optical wireless communications.

* * * * *